United States Patent
Nikain et al.

(10) Patent No.: US 11,165,627 B2
(45) Date of Patent: Nov. 2, 2021

(54) SELF-ASSEMBLING AND SELF-CONFIGURING MICROSERVICES

(71) Applicant: AT&T Intellectual Property I, L.P., Atlanta, GA (US)

(72) Inventors: Mohammad Nikain, Atlanta, GA (US); David Lu, Irving, TX (US); Daniel Connolly, Suwanee, GA (US); Jiyuan Wang, Cumming, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 6 days.

(21) Appl. No.: 16/526,160

(22) Filed: Jul. 30, 2019

(65) Prior Publication Data
US 2021/0036909 A1    Feb. 4, 2021

(51) Int. Cl.
*G06F 15/16*    (2006.01)
*H04L 12/24*    (2006.01)

(52) U.S. Cl.
CPC ........ *H04L 41/044* (2013.01); *H04L 41/0806* (2013.01); *H04L 41/0866* (2013.01); *H04L 41/0886* (2013.01)

(58) Field of Classification Search
CPC ............... H04L 41/044; H04L 41/0886; H04L 41/0806; H04L 41/0866
See application file for complete search history.

(56) References Cited

U.S. PATENT DOCUMENTS

| | | | |
|---|---|---|---|
| 8,181,153 B2 | 5/2012 | Grechanik | |
| 2002/0147771 A1* | 10/2002 | Traversal | H04L 29/12452 709/203 |
| 2016/0124742 A1* | 5/2016 | Rangasamy | H04L 41/0803 717/103 |
| 2017/0374180 A1 | 12/2017 | Gowda et al. | |
| 2018/0121221 A1* | 5/2018 | Ahuja | H04L 63/02 |
| 2018/0307524 A1* | 10/2018 | Vyas | G06F 9/45504 |
| 2019/0340088 A1 | 11/2019 | Sanakkayala et al. | |
| 2020/0133744 A1* | 4/2020 | MacLeod | G06F 30/3312 |
| 2020/0133795 A1* | 4/2020 | Rhodes | G06F 11/1469 |
| 2020/0195526 A1* | 6/2020 | Eberlein | G06F 9/5077 |
| 2020/0249994 A1* | 8/2020 | Hrivnak | G06F 9/526 |

\* cited by examiner

*Primary Examiner* — Padma Mundur
(74) *Attorney, Agent, or Firm* — BakerHostetler (57) ABSTRACT

A system for managing systems with interrelated microservices with self-assembling and self-configuring microservices includes a plurality of host resource services microservices, a plurality of directory services microservices and a plurality of tenant microservices. Each of the microservices is provided with an API with a standard way to identify the API and its components, which together identify the functionality of the API in a common way. The host resources service microservice are started up in a host. A determination is made whether there is a directory service microservice running in the host and, if there is none, then spinning up a directory service microservice. A plurality of tenant microservices are installed and a determination is made whether all tenant microservices are running, If not, then copies of the tenant microservices that are not running are spun up.

18 Claims, 8 Drawing Sheets

SELF-ASSEMBLING AND SELF-CONFIGURING MICROSERVICES

TECHNICAL FIELD

The present disclosure relates to the management of systems with interrelated services. More particularly, the disclosure relates to a method, system, and computer program for managing systems with interrelated microservices with self-assembling and self-configuring microservices.

BACKGROUND

Replacement of large, multi-feature, operations support systems (OSS systems) (e.g. Inventory management, fault management, etc.) with smaller, more focused, systems (microservices) effectively replaces each large OSS with (on average) N microservices. Since the OSS are mostly interconnected, the number of interconnections among the microservices is larger by order of N-squared.

The traditional methods in managing an OSS infrastructure involve planning the OSS functionality and interconnections (i.e. interface agreements), by a central team of architects/engineers. After each OSS module is ready, each of its interfaces is "integration tested" with other systems (typically called end-to-end test) and is then put into production.

Communication service providers (CSPs) are transitioning to OSS architectures based on microservices. Microservices are an architectural and organizational approach to software development where software is composed of small independent services, deployed in a host (physical or virtual machine), that communicate over well-defined application programming interfaces (APIs). These services are owned by small, self-contained teams. Microservices are autonomous. Each component service in a microservices architecture can be developed, deployed, operated, and scaled without affecting the functioning of other services. Services do not need to share any of their code or implementation with other services. Any communication between individual components happens via well-defined APIs. Microservices are specialized. Each service is designed for a set of capabilities and focuses on solving a specific problem. If developers contribute more code to a service over time and the service becomes complex, it can be broken into smaller services.

The microservice architecture provides agility. Microservices foster an organization of small, independent teams that take ownership of their services. Teams act within a small and well understood context, and are empowered to work more independently and more quickly. This shortens development cycle times.

Microservices provide flexible scaling. Microservices allow each service to be independently scaled to meet demand for the application feature it supports. This enables teams to right-size infrastructure needs, accurately measure the cost of a feature, and maintain availability if a service experiences a spike in demand. Microservices provide for easy deployment. Microservices enable continuous integration and continuous delivery, making it easy to try out new ideas and to roll back if something doesn't work. The low cost of failure enables experimentation, makes it easier to update code, and accelerates time-to-market for new features. Microservices architectures do not follow a "one size fits all" approach. Teams have the freedom to choose the best tool to solve their specific problems. As a consequence, teams building microservices can choose the best tool for each job. Dividing software into compact modules enables programmers to reuse the code for multiple purposes. A service written for a certain function can be used as a template for another feature. Unlike a monolithic architecture, where the failure of a single component can cause the whole application to fail, microservices failure result in the degradation of functionality and not the crash of the application.

In a microservices environment, the "architect" team has to consider N-times more components (evolving on different schedules) and N-Squared a greater number of interfaces which, due to their numbers, can easily fall out of sync (in terms of compatibility). The end result introduces a number of problems. One problem is that revisions get out of sync (one microservice upgrades and breaks other microservices downstream, e.g. its clients). Another problem is that load balancing becomes a major issue as it is difficult to foresee how microservices put loads on other microservices, resulting in slow performance and crashes. Yet another problem occurs when microservices functionality overlaps with other microservices or gaps are introduced into the infrastructure which are not covered by any microservices. With the use of microservices troubleshooting becomes very difficult since it is not easily understood whether the problem is with one microservice, its downstream services, or a design flaw. These issues hinder the migration to microservices, cause the microservices-based OSS infrastructure to not function properly, or both, which in either case can result in significant operations cost along with loss of productivity and savings opportunities.

SUMMARY

One general aspect includes a starting up a host resources service microservice (HRSMS) in a host and then determining whether there is a directory service microservice (DSMS) running. When there is a determination that there is no DMS running, spinning a first DMS. Thereafter the method installs a plurality of tenant microservices (TMSs) in the host; and determines whether each of the plurality of TMSs are running. When it is determined that one of the plurality of TMSs is not running, the method spins up a copy of the TMS that is not running.

Implementations may include the method where each of the HRSMSs, the DSMSs and the TMSs include an API including a list of individual functions available over the API, input parameters, output parameters, a revision, a security scheme, and a set of tags where a functionality of the API is identified in a common way. Another implementation may include the method where each of the HRSMS, the DMS and the plurality of TMSs, monitors and configures itself. Yet another implementation may include the method further including determining whether there is a required number of DMS copies are running; and when it is determined that there is not the required number of DMS copies running, spinning a DMS copy of the DMS. A further implementation may include the method further including creating at least one HRSMS copy of the HRSMS and determining if there is a requisite number of copies of the HRSMS running. When it is determined that there is not the requisite number of copies of the HRSMS running, spinning an additional copy of the HRSMS. Another implementation include the steps of periodically determining whether there is an excess number of copies of the HRSMS, and when there are too many HRSMS copies running, shutting down one of the HRSMS copies using a leader election process. Another implementation includes the further step of determining, upon a startup of each TMS in the plurality of TMSs, whether a corresponding supplier TMS is running; and when the corresponding supplier TMS is not running spinning up a replica of a corresponding supplier TMS.

One general aspect includes a system including: a memory for storing computer instructions; a host computer coupled with the memory, where the host computer, responsive to executing the computer instructions, performs operations including starting up an HRSMS in a host. The operations also include determining whether there a DSMS running, and when there is a determination that there is no DSMS running, spinning a first DSMS. The operations further include installing a plurality of TMSs in the host, and determining whether each of the plurality of TMSs are running. When a first TMS is not running, then spinning up a copy of the first TMS.

One general aspect includes a non-transitory, tangible computer-readable medium having computer-executable instructions stored thereon which, when executed by a computer, cause the computer to perform a method including starting up an HRSMS in a host, and then determining whether there is a DSMS running. When there is a determination that there is no DSMS running, spinning a first DSMS. The method performed by the execution of the computer-executable instructions further include installing a plurality of TMSs in the host; determining whether each of the plurality of TMSs are running; and when a first TMS is not running, spinning up a copy of the first TMS.

DETAILED DESCRIPTION OF ILLUSTRATIVE EMBODIMENTS

Figure 1:
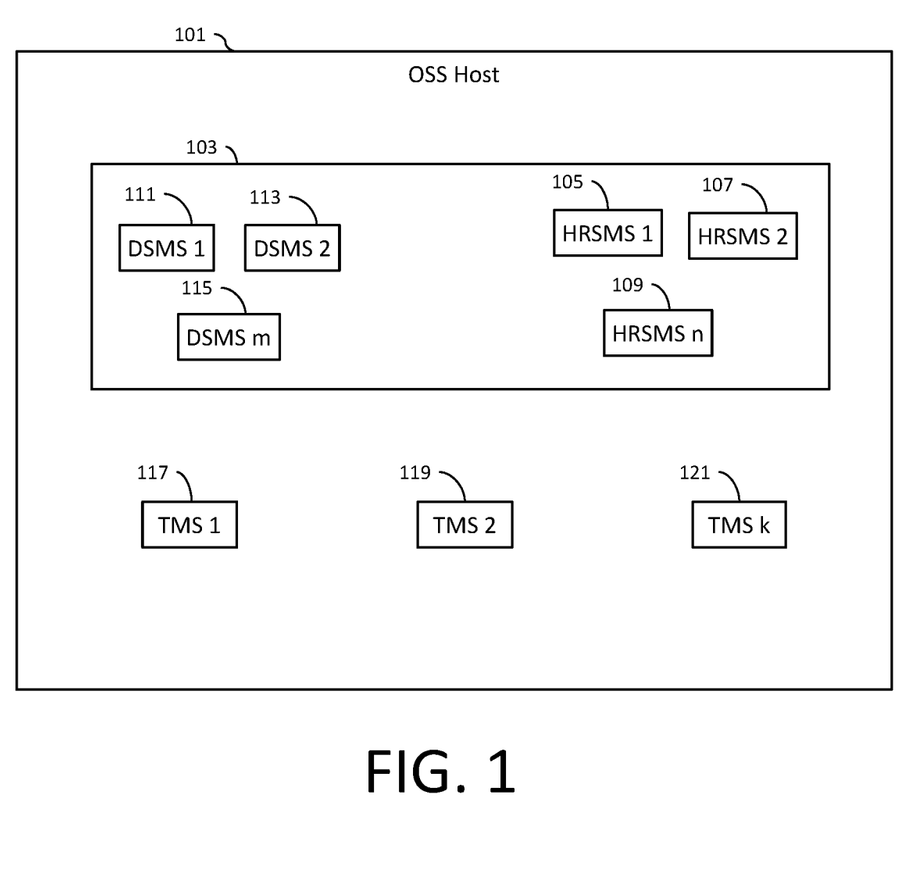
FIG. 1 is a block diagram of a system architecture for a system to manage systems with interrelated microservices with self-assembling and self-configuring microservices.

Illustrated in FIG. 1 are the components of a system microservice architecture 100 which may be used in network systems such as for example an OSS. The microservice architecture 100 includes a host 101 which may be a physical or virtual machine, for example a server. The microservice architecture 100 includes a set of infrastructure microservices 103 the elements of which include a plurality of HRSMSs (such as HRSMS-1 105, HRSMS-2 107, and HRSMS-n 109) and a plurality of DSMSs (such as DSMS-1 111, DSMS-2 113 and DSMS-m 115). The microservice architecture 100 also includes a set of tenant microservices (TMSs) such as TMS-1 117, TMS-2 119 and TMS-k 121.

An application programming interface (API) is provided with each microservice with a standard way to identify the API and its components, including the list of components (individual functions available over the API) and for each function: the input parameters, the output parameters, a revision, the security scheme, and a set of "tags" which together identify the functionality of the API in a common way. In an embodiment the API may be designed around representational state transfer (REST) APIs but the solution can be extended to any kind of API.

Each DSMS (e.g. DSMS-1 111, DSMS-2 113 and DSMS-m 115) provides a directory service where the APIs are listed and can be searched by tags or other parameters. Each DSMS allows running a microservices register with it to make the DSMSs known to other microservices. DSMS will publish a web interface similar to the following:

1. method: GET; url= https://localhost:[port]/directory/[service]
   method: GET; url= https://localhost:[port]/directory/[service]/[revision]
   –> obtain info on particular service (specific revision or all revisions)
2. method: GET; url=https://localhost:[port]/directory      –> obtain the whole directory
3. method: POST; url= https://localhost:[port]/directory/[service]

these are examples, but in either case, the port is not known since each DSMS will bind to the first available port, but TMSs can find the port by just scanning available ports; the rest of the URL is a standard that is agreed upon by all TMSs and DSMSs. The response, in the specific case (#1) would be a structure such as the following (this is JSON, but it could be in YAML or other standard; JSON is most popular)

{
"name" : "[servicename]",
"revision" : "[revision, e.g. 1.2.4]",
"baseURL": "https://host:port/",
"standardParams" : { this can be a list of params, such as security modes, types of
     headers that are needed, etc. ; these are expected to be in a
     "standard" language understandable by any TMS and are typically
     used to establish basic connectivity to another TMS}, "specificParams" : { this is a list of services, each specifying a URL path, data elements
    passed, etc; that are handled by TMSs once they established basic
    connectivity and can use it to identify compatible services, etc.
    This data is typically specific to a service or domain and is targeted
    to be understood by TMSs that are "familiar" with this service)
}

The response in a non-specific case (#2) is just an array of the structures above. In the write/update/register case (#3) the TMS client actually passes the structure above to the DSMS which will store and forward it to anyone who asks (#1 or #2). Note that the "specificParams" part doesn't have to be "understood" by the DSMS, the DSMS just has to store and forward it (similar to an http "Cookie" concept).

Each HRSMS (e.g. HRSMS-1 105, HRSMS-2 107 and HRSMS-n 109) tracks performance parameters of host 101 (and any other hosts) and the other microservices, and can 'instantiate' a microservice (i.e. download it from repository and start it up). The HRSMS is also implemented as a set of microservices (with information included in the API and listed in DSMSs). Host performance parameters include % CPU utilization, % CPU time, # of threads, memory usage, page swaps, etc. which HRSMS can measure from the operating system. IT an also gather "delay" or "capacity" information from TMSs. In the latter case, each TMS has to provide this info through a well-known port (e.g. http://host:port/perfinfo) and in a specific language (e.g. {"capacity": "80%", "delay": "70%" }, %'s are used here since the application knows its own SLAs and reporting this way allows HRSMS to make decisions without knowing such SLA details).

Each TMS (e.g. TMS-1 117, TMS-2 119 and TMS-k 121) are microservices which are added to perform specific system functions such as OSS functions. Examples of "OSS functions" that each microservice performs are as follows:

TMS1: Inventory System: maintains the inventory for virtual machines loaded into a cloud infrastructure (keeps a record for each VM, such as name, owner, etc.), shows what server is the VM running on, shows the connectivity to VM to internal (Tenant) networks.

TMS2: VM activation: Instantiates a virtual machine in a cloud infrastructure. Receives parameters regarding the image type, memory size, network interfaces, etc. and "creates" the machine in a cloud infrastructure. Also interconnects to TMS1 to store the information once it is created TMS3: VM Networking: Creates a "client network" in the cloud infrastructure and configures the network interfaces of a particular VM to interconnect to the "client network" and to the outside world (e.g. internet). It is called by TMS2 after it (TMS2) created the VM with a request to configure network elements. It also interconnects with TMS1 to store the client network data and updated configurations.

The self-configuration and adaptation process is handled by the algorithm set forth below. As such, each process group (DSMSs, HRSMSs, and TMSs) monitors and configures itself, and in some instances processes in other groups. For example:

HRSMSs make sure there is sufficient HRSMSs running (monitors and configures its own group).

HRSMSs also make sure there are sufficient DSMSs (monitors and configures DSMSs, which is a different group of processes than HRSMS).

DSMSs make sure there are enough DSMSs are running too (monitor and config its own).

DSMSs know how many HRSMSs are running, and if there is not enough they will ask one of the remaining HRSMSs to start new ones (in this case, DSMS is monitoring and to some extent configuring HRSMSs).

Same with TMSs, etc.

The main point here is that there are cross checking going on so there are different forms of recovery if one item or one group fails. (except that HRSMS is the only group that knows how to start processes, so if the last copy is gone, then recovery is not possible; but everyone [remaining, HRSMSs, DSMSs, and TMSs, will all be requesting new copies to be spun up if the numbers of HRSMSs dwindle].

Since there are many copies of each group members running, each group will elect a leader when an action (e.g. start an instance of a process, shutdown and instance, etc.) is necessary. The leader election process ensures that multiple processes do not overdo or undermine an action. This "leader election" will occur only when an action is ready to be performed and is redone when another action is to be performed. There are a number of leader election algorithms are available (e.g. Shout, Yo-yo, Mega-merger) and can be used. Since these 'actions' are periodically evaluated and performed, if one "leader" fails to perform the correct action, then on the next round, the process is repeated and another leader will perform the action. For the purposes of simplifying the description of the algorithms below, when we state that HRSMS performs "task x" we mean that the leader elected by the group of active Host Resources Service will perform "task x"

Figure 2:
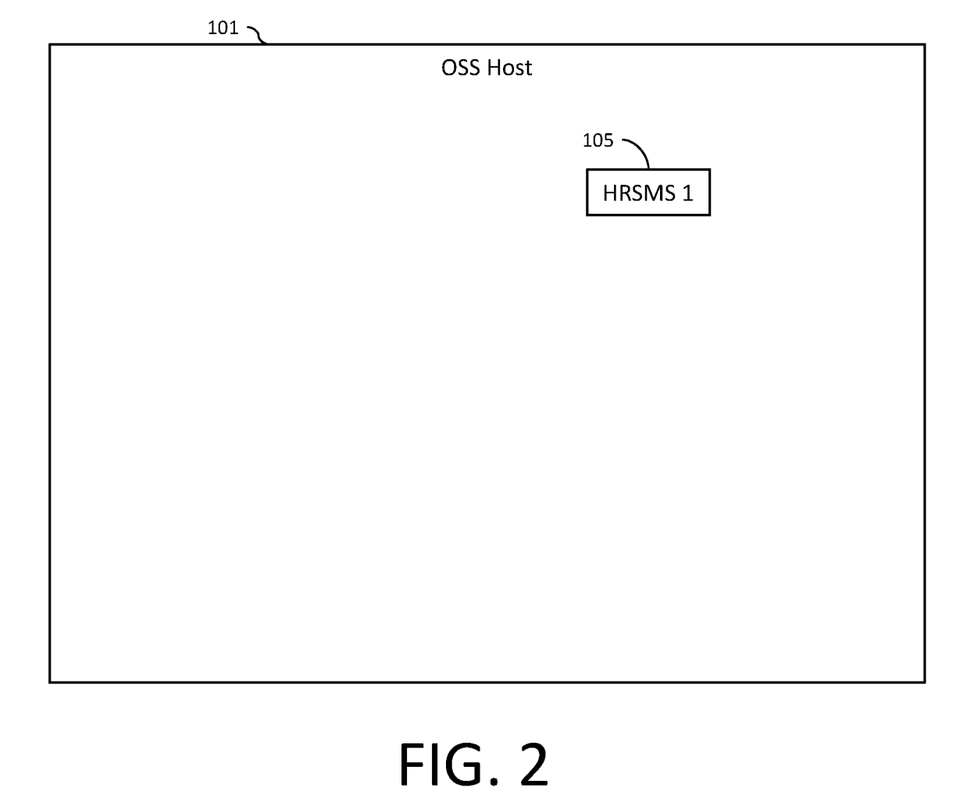
FIG. 2 is a block diagram of the initial configuration of the system.

Initially, there are no microservices (DSMS, HRSMS, or any TMS) resident in the host. It is necessary to install one instance of an HRSMS on one server (acts as to the seed, fertilized egg, etc. in a biological analogy). This is illustrated in FIG. 2.

Figure 3:
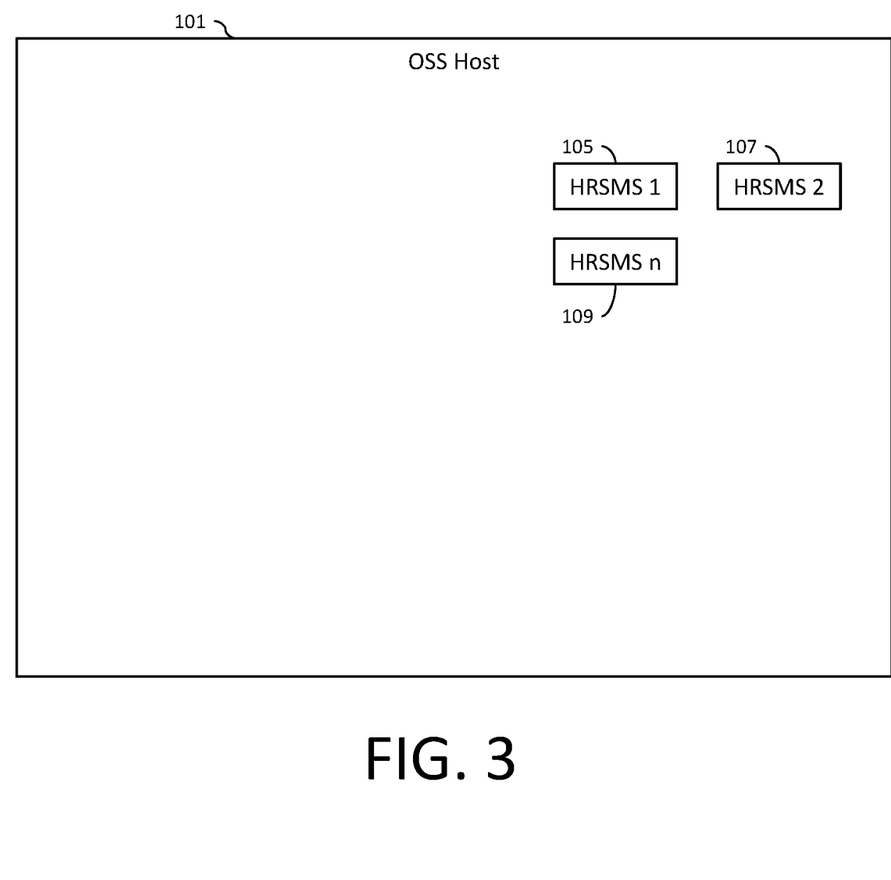
FIG. 3 is a block diagram of the configuration of the system after an HRSMS has been duplicated.

When an instance of an HRSMS starts up (e.g. HRSMS-1 105 in FIG. 2), and periodically during its operation, HRSMS-1 105 looks for other instances of itself, and if it doesn't find the required number of HRSMs (min 1 additional one, but can be configured for more based on infrastructure), HRSMS-1 105 will spin-up other copies of itself (HRMS-2 107 and HRMS-n 109 in FIG. 3.) Subsequently HRSMS-1 105 will monitor these copies to ensure a proper number is running. If ever the number falls below the prescribed (requisite) number (e.g. due to crashes, performance slow down, etc.), HRSMS-1 105 will spin up copies or move existing instances to other hosts (e.g. spin one on another host, and shut a local one down) to ensure proper performance. As such, if only one copy is still alive, it will regrow back to the correct number. this is for a case where one Host is overloaded (has too many TMSs running on it), but another host in the cluster has a very low load; in this case, you may not need more copies of a TMS (as they are all running slow due to the host's heavy load), so an instance of the TMS on host 2 would be started and then one instance of a TMS on host 1 would be shut down. This has the effect of "moving" a TMS to a different host (despite the fact that the actual sequence of events is to kill one and start another).

Figure 4:
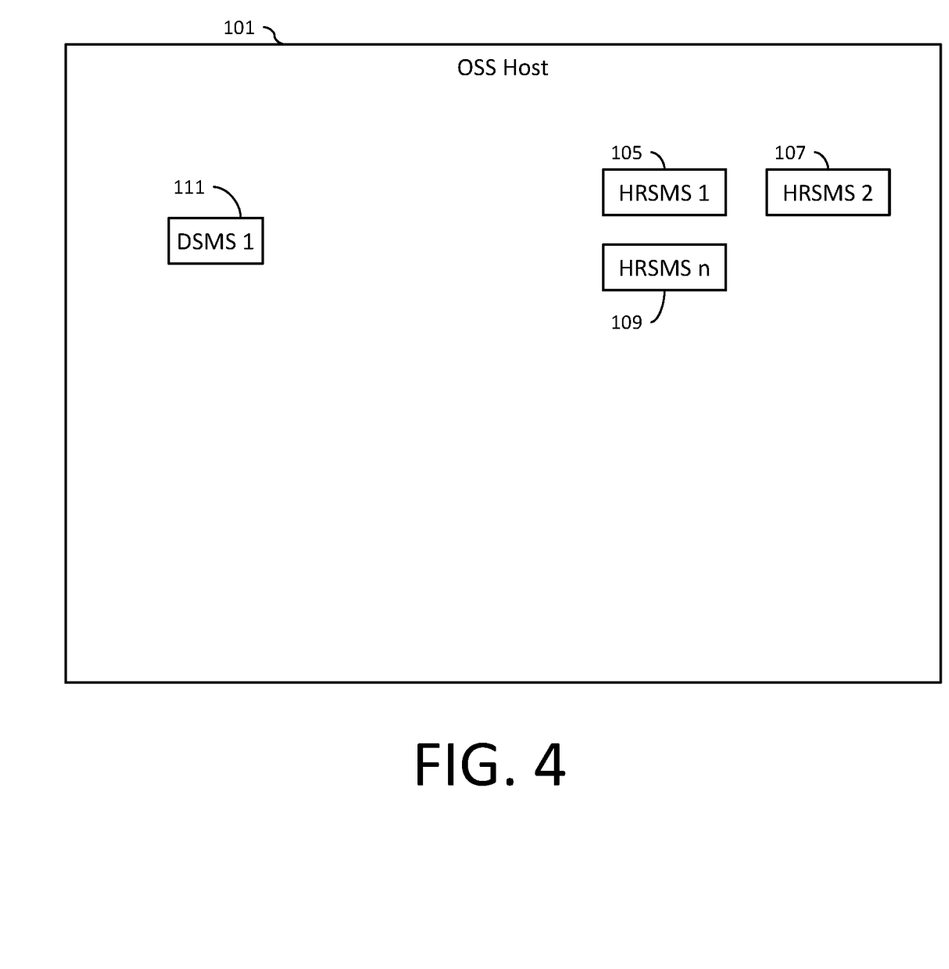
FIG. 4 is a block diagram illustrating the system configuration after the spin up of a DSMS.

An HRSMS (e.g. HRSMS-1 105) will also look for a DSMS, if it doesn't find a DSMS, the HRSMS will spin-up a copy (see DSMS-1 111 in FIG. 4). The HRSMS will continue to monitor the host to ensure that there is a DSMS and at any time the HRSMS cannot contact any copy of a DSMS, it will spin-up a copy of the DSMS.

Figure 5:
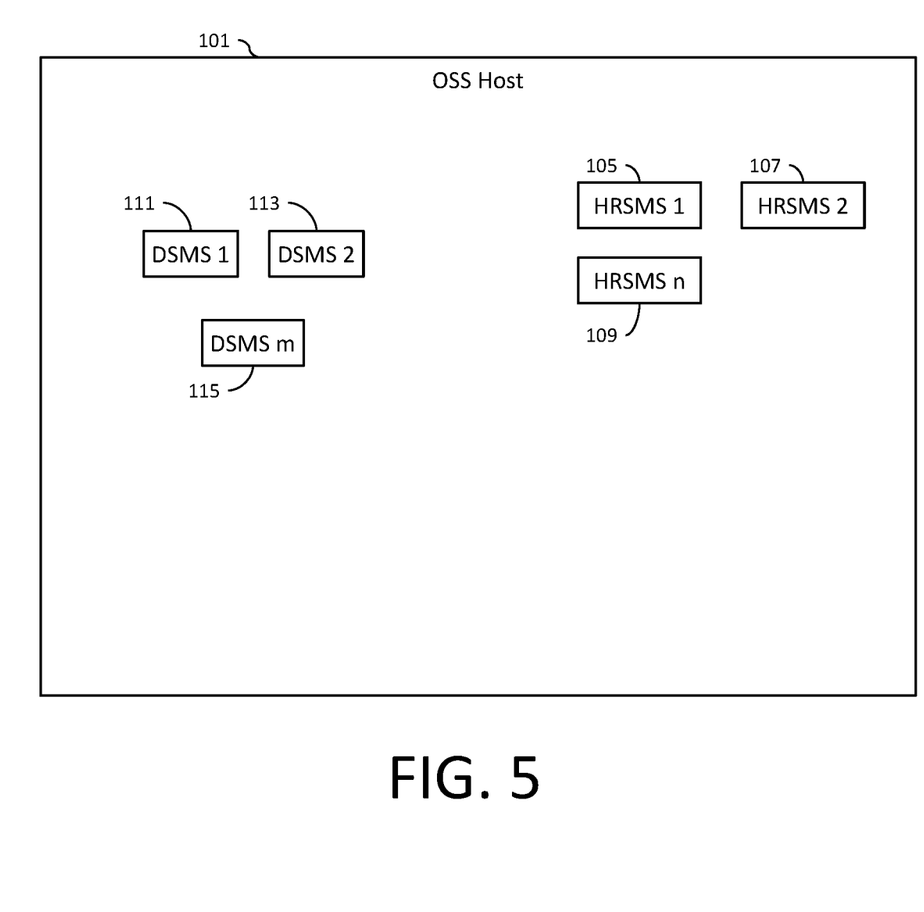
FIG. 5 is a block diagram illustrating the system configuration after duplication of the DSMS.

Upon the startup of an instance of DSMS (e.g. DSMS-1 111) (and periodically during its operation), the DSMS will look for additional copies of itself, and if the DSMS does not see sufficient instances, the DSMS will request the lead HRSMS to spin one up (see DSMS-2 113 and DSMS-m 115 in FIG. 5).

The lead DSMS may also request the lead HRSMS to load balance (i.e. move an instance to another host) if performance drops below a threshold. As such, as long as one copy of HRSMS is still running, sufficient number of DSMSs will also regrow to the correct number.

If the DSMS or HRSMS count somehow exceed the required number (due to multiple instances independently spin up more copies), they will shut themselves down. Note that this, as with other actions, is done through a leader election process so only one copy in fact shuts down. The shutdown and startup processes occur periodically so the system might periodically have too many or too little number of processes, but it will eventually converge to the correct number.

Figure 6:
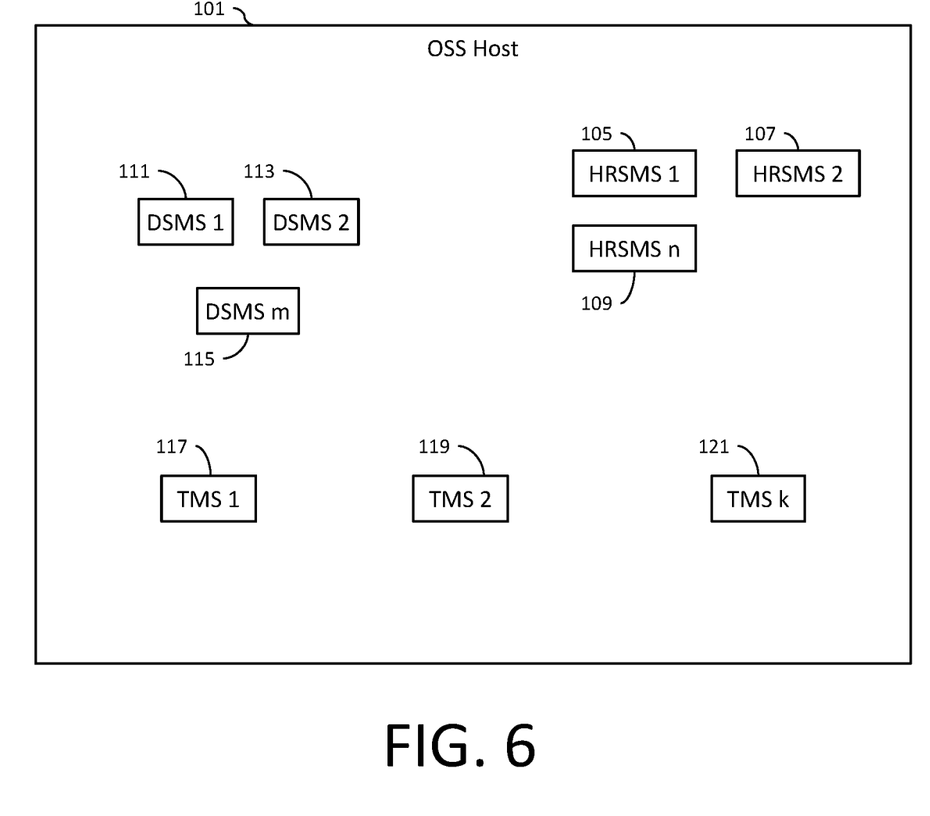
FIG. 6 is a block diagram illustrating the system configuration after the introduction of a plurality of TMSs.

An HRSMS also checks to ensure all the processes that are in the TMS group (see FIG. 6) are running (it gets this information from the DSMS, as it is the directory services, and lists all the microservices that are configured). If any TMS is not running (or is not responsive), the HRSMS will spin up one copy of that TMS (as it did with the DSMS itself).

When an instance of one of the TMSs (note that TMS groups contains all the 'tenant' microservices) starts up (and periodically during its operation), the TMS checks its "suppliers" (i.e. the microservices that it depends on) and if it ever notices that one is not running or responsive, it will request an HRSMS to start the supplier TMS up or to load balance the supplier TMS (i.e. move it to another host or spin up a copy on another host). The TMSs get the information about the instances of its "suppliers" from a DSMS and passes the information to an HRSMS for the request. Also, when an HRSMS starts up a TMS, the HRSMS will pass on instances of DSMS to it so that the DSMS can register their location with DSMS instances so that the TMS could be found by other microservices.

If an instance of a TMS is idle for an extended period of time (or has very low load as it is configured) and there are other instances running, the TMS will shut itself down (again, note that this is done using the leader election process to avoid a complete shutdown of all the copies).

The DSMSs continually monitor availability of TMSs (and TMSs evaluate availability of their suppliers), so even if somehow all copies of a needed microservice shutdown, they will get restarted by the methodology described above.

Figure 7:
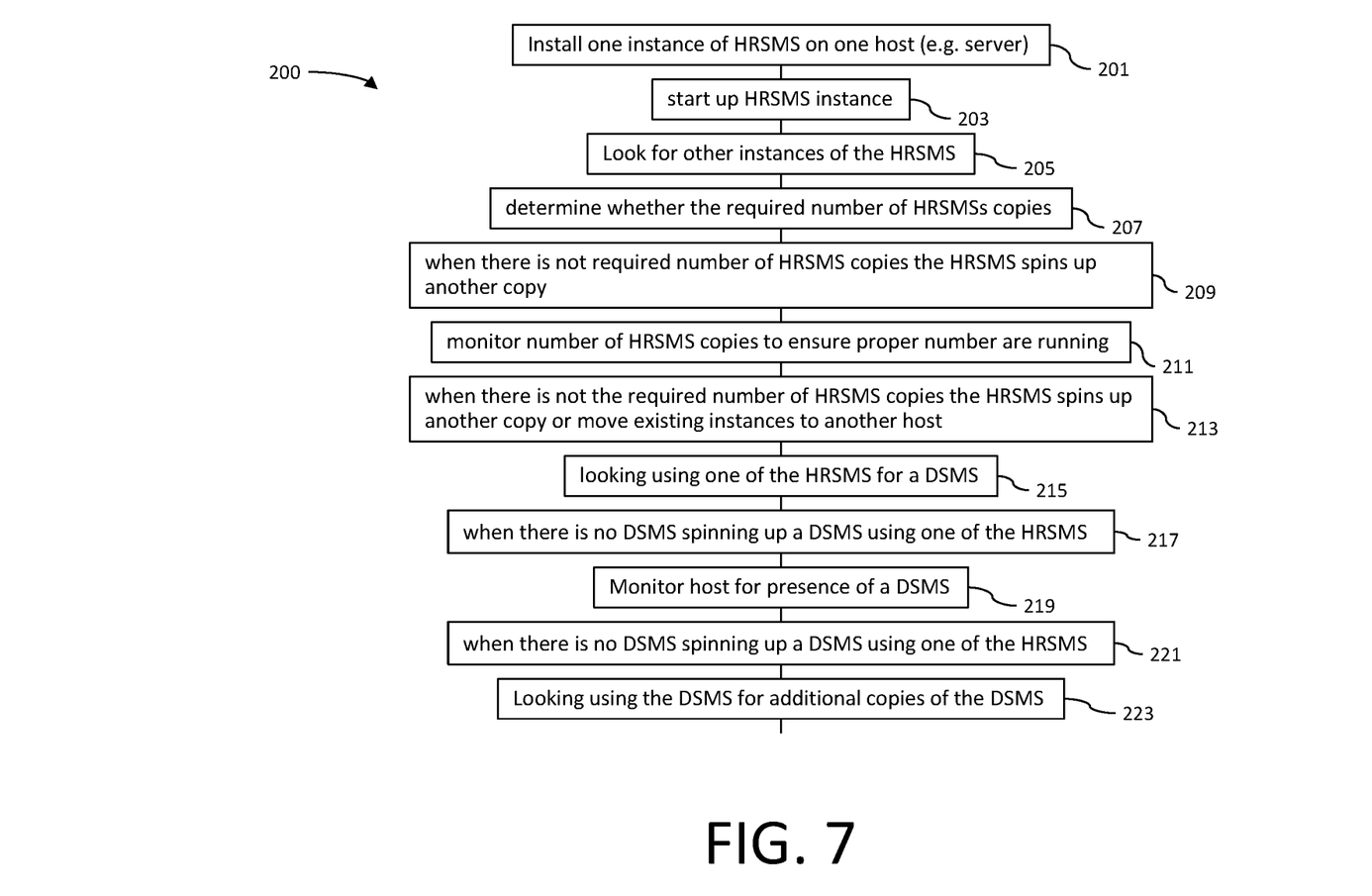
FIG. 7 is a flowchart of part of a method for managing systems with interrelated microservices with self-assembling and self-configuring microservices.
Figure 8:
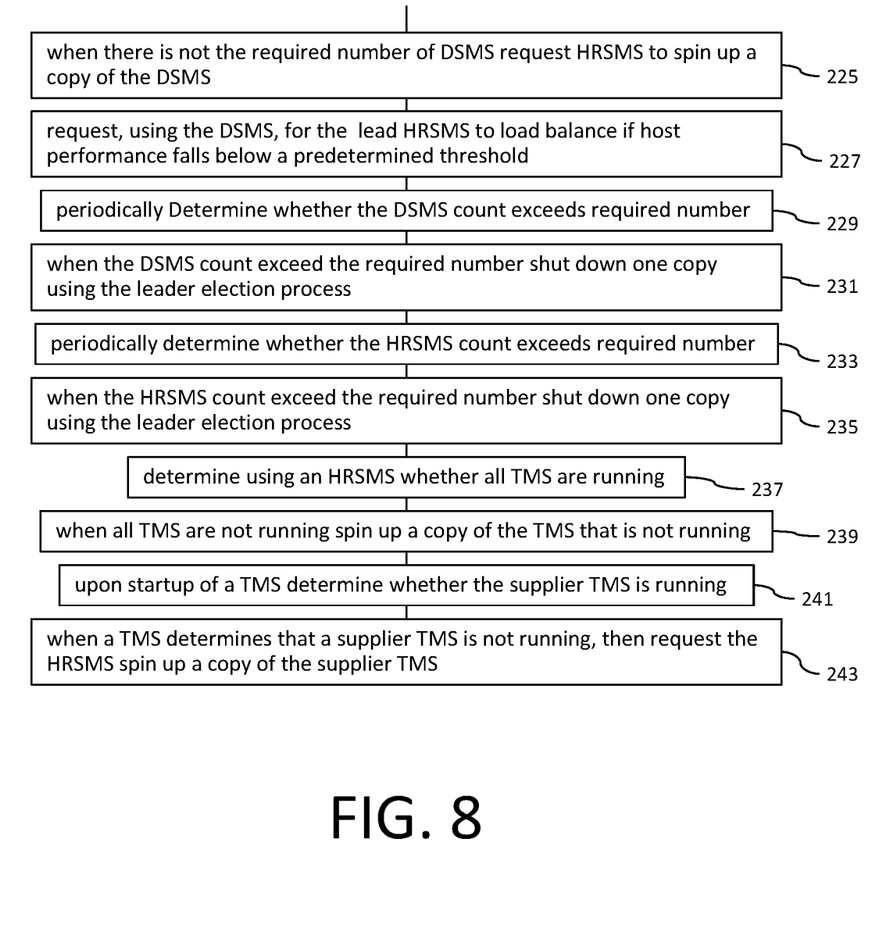
FIG. 8 is a flowchart of part of a method for managing systems with interrelated microservices with self-assembling and self-configuring microservices.

Illustrated in FIG. 7 and FIG. 8 is a method 200 for implementing self-assembling and self-configuring microservices.

In step 201, the method 200 installs an HRSMS instance on one host (e.g. server).

In step 203, the method 200 starts up the HRSMS instance.

In step 205, the method 200 looks for other instances of the HRSMS.

In step 207, the method 200 determines whether the required number of HRSMSs copies are running.

In step 209, the method 200 instructs the HRSMS to spin up another copy when there is not required number of HRSMS copies.

In step 211, monitors number of HRSMS copies to ensure proper number are running.

In step 213, the method 200 instructs the HRSMS to spin up another copy or move existing instances to another host when there is not the required number of HRSMS copies.

In step 215, the method 200 looks for a DSMS through the use of one of the HRSMS.

In step 217, the method 200 instructs one of the HRSMS to spin up a DSMS when there is no active DSMS.

In step 219, the method 200 periodically monitors the host to determine if there is an active DSMS.

In step 221, the method 200 instructs an HRSMS to spin up a DSMS when there is no DSMS.

In step 223, the method 200 instructs the DSMS to look for additional copies of the DSMS.

In step 225, the method 200 request HRSMS to spin up a copy of the DSMS when there is not the required number of DSMSs.

In step 227, the method 200 requests, using the DSMS, for the lead HRSMS to load balance if host performance falls below a predetermined threshold.

In step 229, the method 200 periodically determines whether the DSMS count exceeds a required number.

In step 231, the method 200 instructs the DSMS to shut down one copy of the DSMS using the leader election process when the DSMS count exceed the required number.

In step 233, the method 200 periodically determines whether the HRSMS count exceeds a required number.

In step 235, the method 200 instructs the HRSMS to shut down one copy using the leader election process when the HRSMS count exceed the required number.

In step 237, the method 200 instructs the HRSMS to determine whether all TMS are running.

In step 239, the method 200 instructs the HRSMS to spin up a copy of a TMS that is not running when all TMS are not running.

In step 241, the method 200 instruct a TMS to determine whether a supplier TMS is running upon startup of a TMS.

In step 243, the method 200 instructs the HRSMS to spin up a copy of the supplier TMS when a TMS determines that a supplier TMS is not running.

The method 200 does away with most of centralized planning. It provides an infrastructure where a microservice can be "dropped" into an OSS infrastructure and automatically detect its environment, find its peers, interconnect with the peers, identify and request missing components, and load-balance the infrastructure to meet its needs. While there are microservices that provide services to other microservices, there is no central infrastructure that manages the entire operation; the algorithms and process is completely distributed and handled by peer microservices. The method 200 allows hundreds or even thousands of microservices to self-manage, self-load balance, and self-configure in an environment which otherwise would be unmanageable.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:
    starting up a host resources services microservice in a host;
    determining that there is a directory service microservice not running, wherein not running is indicative of not being able to communicate with the host resources services microservice;
    when the directory service microservice is not running, spinning a first directory service microservice;
    installing a plurality of tenant microservices in the host, wherein the plurality of tenant microservices perform specific operations support system functions, the operations support system functions comprise an inventory system, virtual machine activation, and virtual machine networking;
    determining, based on an indication from the first directory microservice, whether each of the plurality of tenant microservices are running;
    when a first tenant microservice is not running, spinning up a copy of the first tenant microservice;
    determining that performance of the host has fallen below a predetermined performance threshold; and
    in response to the determining that the performance of the host has fallen below the predetermined performance threshold, requesting the host resources services microservice to load balance using the first directory service microservice.

2. The method of claim 1 wherein the host resources services microservice, the directory service microservice and the plurality of tenant microservices each comprise an application programming interface (API) including a list of individual functions available over the API, input parameters, output parameters, a revision, a security scheme, and a set of tags whereby a functionality of the API is identified in a common way.

3. The method of claim 1 wherein the host resources services microservice, the directory service microservice and the plurality of tenant microservices, monitor and configure themselves.

4. The method of claim 1 further comprising:
    determining whether there is a required number of directory service microservice copies running; and
    when it is determined that there is not the required number of directory service microservice copies running, spinning a directory service microservice copy of the directory service microservice.

5. The method of claim 1 further comprising:
    creating at least one copy of the host resources services microservice;
    determining whether a requisite number of copies of the host resources services microservice are running; and
    when it is determined that there the requisite number of copies of the host resources services microservice are not running, spinning an additional copy of the host resources services microservice.

6. The method of claim 5 further comprising:
    periodically determining whether there are more than a threshold number of running copies of the host resources services microservices; and
    when there are more than the threshold number of running copies of the host resources services microservice, shutting down one of the host resources services microservices copies using a leader election process.

7. The method of claim 1 further comprising:
    determining for each of the plurality of tenant microservices whether a corresponding supplier tenant microservice is running; and
    when the corresponding supplier tenant microservice is not running spinning up a replica of the corresponding supplier tenant microservice.

8. A system comprising:
    a memory for storing computer instructions;
    a host computer coupled with the memory, wherein the host computer, responsive to executing the computer instructions, performs operations comprising:
        starting up a host resources services microservice in a host;
        determining that there is a directory service microservice not running, wherein not running is indicative of not being able to communicate with the lead host resources services microservice;
        when the directory service microservice is not running, spinning a first directory service microservice;
        installing a plurality of tenant microservices in the host, wherein the plurality of tenant microservices perform specific operations support system functions, the operations support system functions comprise an inventory system, virtual machine activation, and virtual machine networking;
        determining, based on an indication from the first directory microservice, whether each of the plurality of tenant microservices are running;
        when a first tenant microservice is not running, spinning up a copy of the first tenant microservice;
        determining that performance of the host has fallen below a predetermined performance threshold; and
        in response to the determining that the performance of the host has fallen below the predetermined performance threshold, requesting a lead host resources services microservice to load balance using the first directory service microservice.

9. The system of claim 8 wherein host resource services microservices, the directory service microservice and the plurality of tenant microservices each comprise an application programming interface (API) including a list of individual functions available over the API, input parameters, output parameters, a revision, a security scheme, and a set of tags whereby a functionality of the API is identified in a common way.

10. The system of claim 8 wherein host resources services microservice, the directory service microservice and the plurality of tenant microservices, monitor and configure themselves.

11. The system of claim 8 wherein the operations performed by the host computer further comprise:
    determining whether there is a required number of directory service microservice copies running; and
    when it is determined that there are not the required number of directory service microservice copies running, spinning a directory service microservice copy of the directory service microservice.

12. The system of claim 8 wherein the operations performed by the host computer further comprise:
    creating at least one copy of the host resources services microservice;
    determining a requisite number of copies of the host resources services microservice are running; and
    when it is determined that the requisite number of copies of the host resources services microservice are not running, spinning an additional copy of the host resource services microservice.

13. The system of claim 12 wherein the operations performed by the host computer further comprise:
    periodically determining whether there are more than a threshold number of running copies of the host resources services microservices; and
    when there are more than the threshold number of running copies of the host resources services microservice, shutting down one of the host resources services microservices copies using a leader election process.

14. The system of claim 8 wherein the operations performed by the host computer further comprise:
    determining for each of the plurality of tenant microservices whether a corresponding supplier tenant microservice is running; and
    when the corresponding supplier tenant microservice is not running spinning up a replica of the corresponding supplier tenant microservice.

15. A non-transitory, tangible computer-readable medium having computer-executable instructions stored thereon which, when executed by a computer, cause the computer to perform a method comprising:
    starting up a host resources services microservice in a host;
    automatically detecting peers of the host resources services microservice, interconnecting with the peers of the host resources services microservice, identifying and requesting missing components, and load-balancing the infrastructure that comprises a directory service microservice and a tenant microservice by at least:
    determining that there is a directory service microservice running, wherein not running is indicative of not being able to communicate with such microservice;
    when the directory service microservice is not running, spinning a first directory service microservice;
    installing a plurality of tenant microservices in the host, wherein the plurality of tenant microservices perform specific operations support system functions, the operations support system functions comprise an inventory system, virtual machine activation, and virtual machine networking;
    determining, based on an indication from the first directory microservice, whether each of the plurality of tenant microservices are running; and
    when a first tenant microservice is not running, spinning up a copy of the first tenant microservice;
    determining that performance of the host has fallen below a predetermined performance threshold; and
    in response to the determining that the performance of the host has fallen below the predetermined performance threshold, requesting a lead host resources services microservice to load balance using the first directory service microservice.

16. The non-transitory, tangible computer-readable medium of claim 15 wherein the host resources services microservice, the directory service microservice and the plurality of tenant microservices each comprise an application programming interface (API) including a list of individual functions available over the API, input parameters, output parameters, a revision, a security scheme, and a set of tags whereby a functionality of the API is identified in a common way.

17. The non-transitory, tangible computer-readable medium of claim 15 wherein the host resources services microservice, the directory service microservice and the plurality of tenant microservices, monitor and configure themselves.

18. The non-transitory, tangible computer-readable medium of claim 15 wherein the method performed by the computer further comprises:
    determining whether there is a required number of directory service microservice copies running; and
    when it is determined that there is not the required number of directory service microservice copies running, spinning a directory service microservice copy of the directory service microservice.

* * * * *